United States Patent [19]

Kawashima et al.

[11] 4,315,750
[45] Feb. 16, 1982

[54] SPROCKET CHAIN

[75] Inventors: Yoshinori Kawashima, Sakado; Yuji Hashimoto, Tokyo, both of Japan

[73] Assignee: Honda Giken Kogyo Kabushiki Kaisha, Tokyo, Japan

[21] Appl. No.: 116,455

[22] Filed: Jan. 29, 1980

[30] Foreign Application Priority Data

Feb. 7, 1979 [JP] Japan ............................ 54-13021

[51] Int. Cl.³ ................. F16H 7/06; F16H 55/30
[52] U.S. Cl. ................................ 474/153; 474/231
[58] Field of Search ............ 474/206, 209, 226, 229, 474/230, 231, 148, 153, 212, 273

[56] References Cited

U.S. PATENT DOCUMENTS

| | | | |
|---|---|---|---|
| 619,315 | 2/1899 | Keating | 474/231 |
| 2,568,650 | 9/1951 | McIntosh et al. | 474/229 |
| 3,448,629 | 6/1969 | Pfrank et al. | 474/148 |

FOREIGN PATENT DOCUMENTS

| | | | |
|---|---|---|---|
| 17992 | of 1894 | United Kingdom | 474/231 |
| 21854 | of 1896 | United Kingdom | 474/231 |
| 551756 | 9/1941 | United Kingdom | 474/231 |

Primary Examiner—Lawrence J. Staab
Attorney, Agent, or Firm—Lyon & Lyon

[57] ABSTRACT

A sprocket chain having alternating inner links and outer links is formed with the length of each inner link slightly longer than the tooth pitch of a cooperating sprocket and the length of each outer link slightly shorter than the tooth pitch by the same amount. The chain may comprise a roller chain having a roller mounted to turn on each bushing, or may comprise a bush chain having no rollers and in which the bushings make direct contact with the sprocket teeth.

7 Claims, 10 Drawing Figures

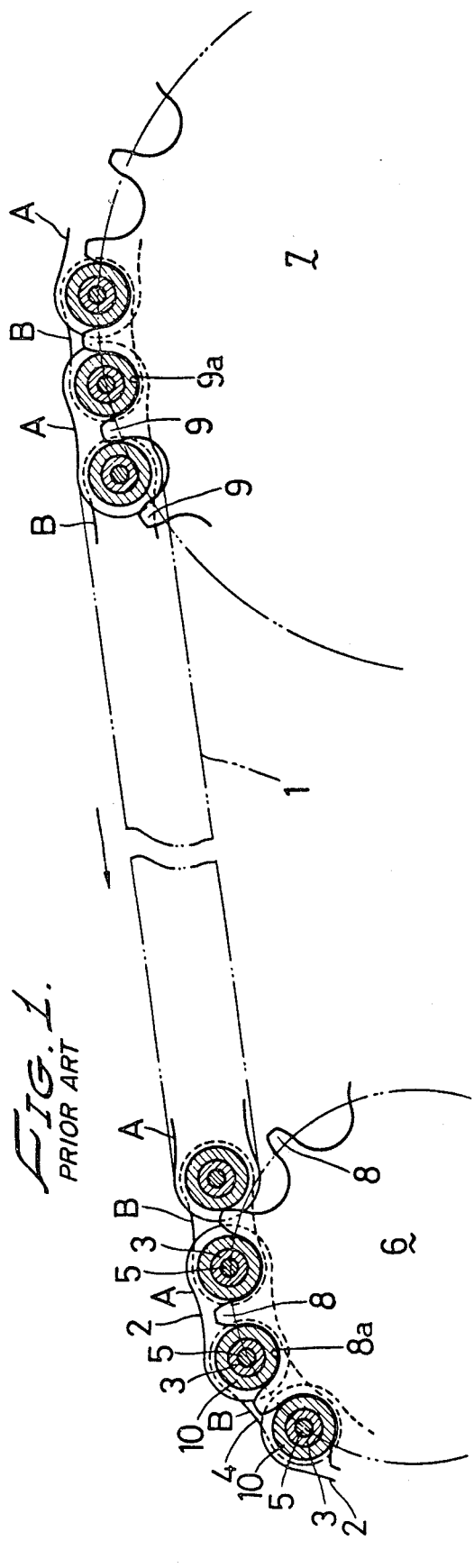
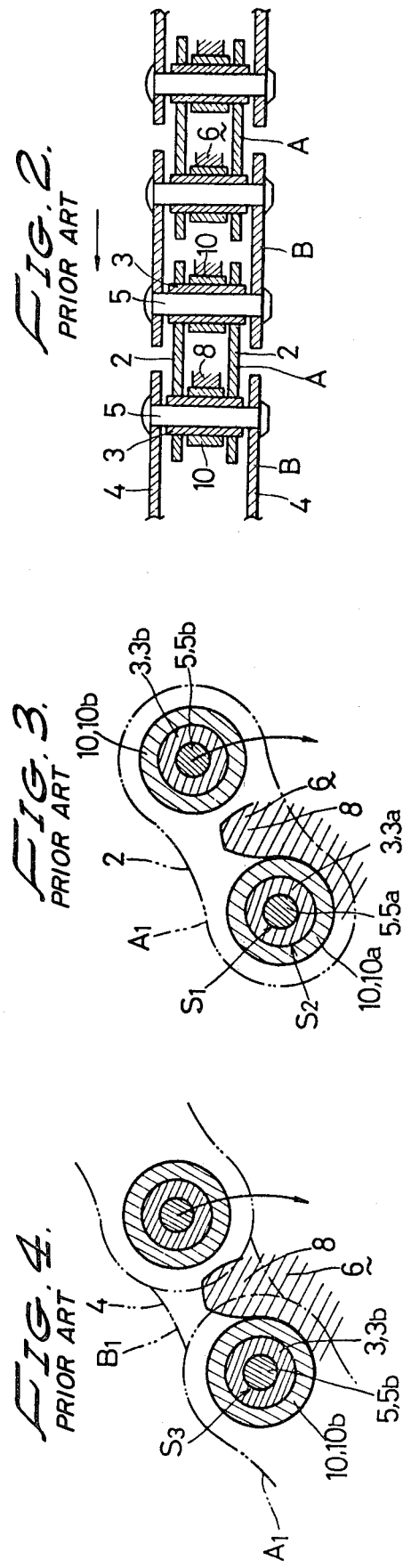

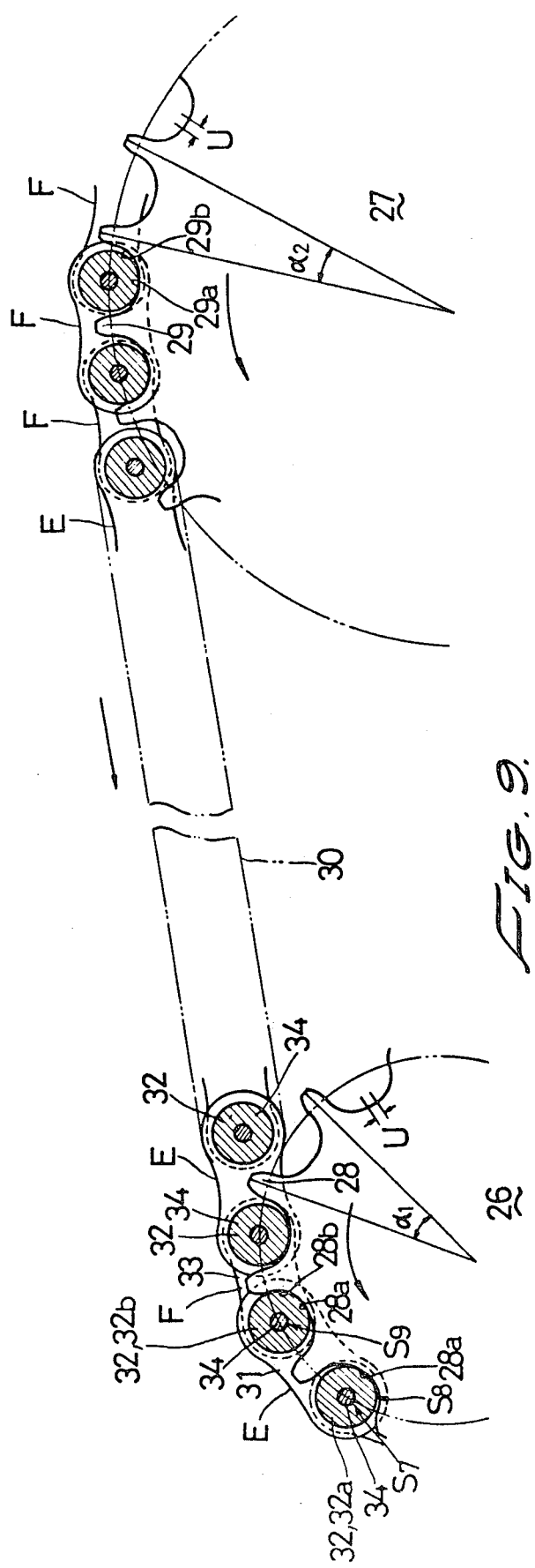
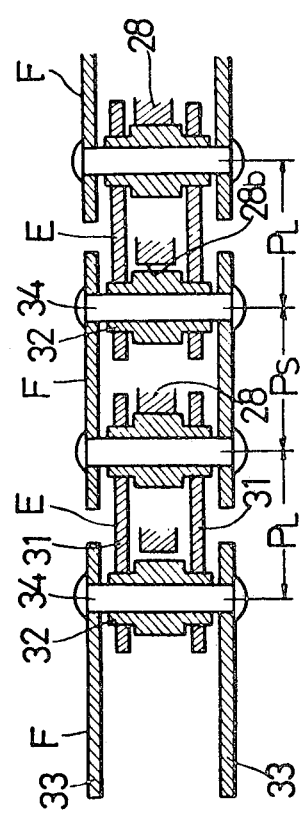
Fig. 9.
Fig. 10.

SPROCKET CHAIN

This invention relates to roller chains and bush chains which cooperate with the teeth of sprockets.

More particularly, this invention relates to a chain and sprocket combination in which each inner link is made slightly longer than the tooth pitch of the sprocket and each outer link is made slightly shorter by the same amount so as to form an unequal length pitch chain. In this way rotary sliding friction produced at the front end and at the rear end of each link is substantially equalized. This reduces the amount of wear and heat resulting from the friction, and this produces improved service life and durability.

Other and more detailed objects and advantages will appear hereinafter.

In the drawings, FIGS. 1, 2, 3 and 4 relate to conventional roller chains.

FIG. 1 is a sectional side elevation showing a conventional roller chain extending between driving and driven sprockets.

FIG. 2 is a sectional plan view of this conventional roller chain.

FIG. 3 is an enlarged sectional side elevation showing action of a conventional roller link.

FIG. 4 is a view similar to FIG. 3 showing action of a conventional pin link.

FIG. 9 is a view similar to FIG. 5 showing a bush chain embodying this invention.

FIG. 10 is a sectional plan view of the chain of FIG. 9.

Figure 5:
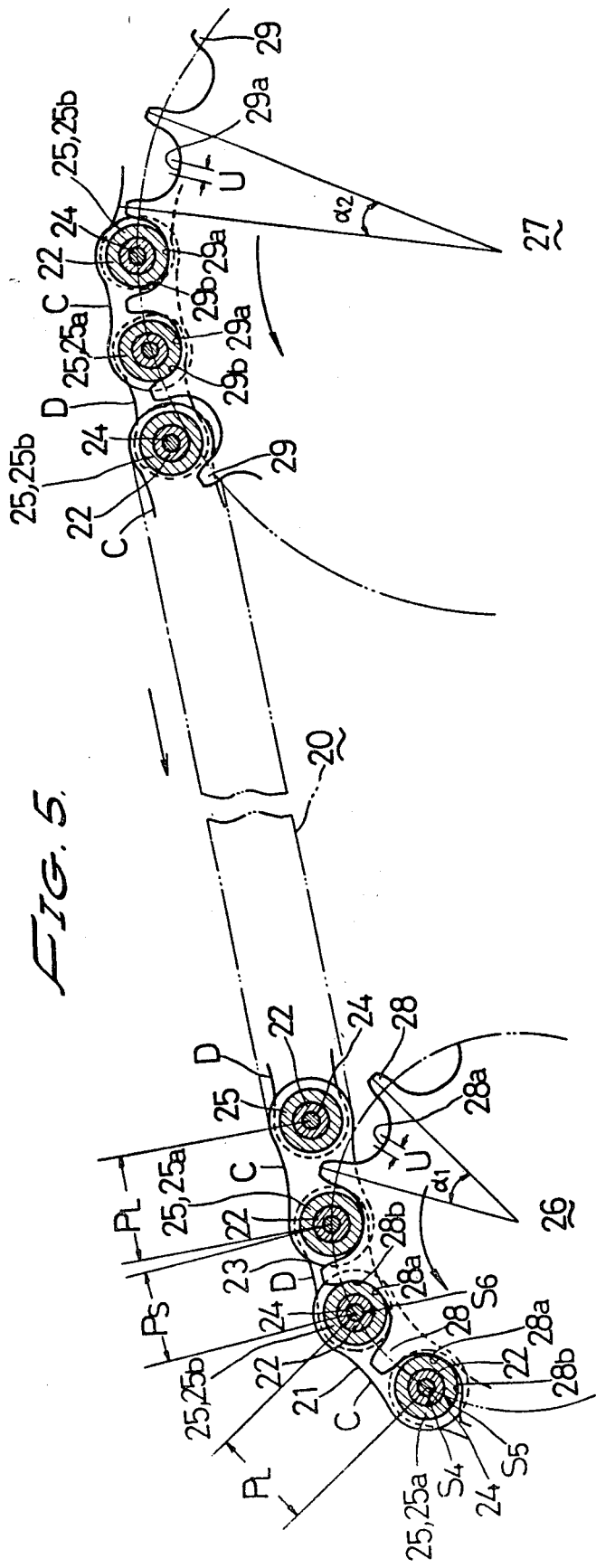
FIG. 5 is a sectional side elevation showing a preferred form of this invention.

Referring to the drawings, the conventional roller chain 1 shown in FIGS. 1–4 is formed by connecting inner roller links A alternately with outer pin links B. Each of the inner roller links A is constructed by fixing a pair of inner link plates 2 to the bushings 3 carried on the pins 5. Each of the outer pin links B is constructed by fixing a pair of outer link plates 4 directly to the pins 5. The bushings 3 are free to turn on the pins 5, and the rollers 10 are free to turn on the bushings 3. The rollers 10 contact the teeth 8 of the driving sprocket 6 and contact the teeth 9 of the driven sprocket 7. The conventional roller chain 1 is an equal pitch chain in which each roller link A and each pin link B are made equal in length, and the tooth faces 8a and 9a of the respective teeth 8 and 9 are formed practically in the same curved shape as the roller 10, so that the tooth-roller contact is all surface contact.

When the conventional roller chain 1 is made to rotate by the driving sprocket 6 and driven sprocket 7, each inner link A and each outer link B turns along the pitch circles of the sprockets, causing rotary sliding movement between the pins 5 and bushings 3, and between the bushings 3 and rollers 10. This is the same with both driving and driven sprockets and therefore it is sufficient to consider this action regarding driving sprocket 6 as shown in FIGS. 3 and 4.

Assume that the conventional roller chain 1 is running in the direction of the arrow as shown in FIG. 1, when a particular roller link $A_1$ begins engaging contact with the driving sprocket 6. In this case, FIG. 3 shows how the trailing portion or rear of this particular roller link $A_1$ turns downward about the forward pin 5a serving as a fulcrum. This is understandable if the sprocket is considered to be stationary while the links of the chain wrap around it. Since the inner plates 2 which comprise the roller link A are integrally fastened to bushings 3, turning of the particular roller link $A_1$ produces rotary sliding friction on the contact surface $S_1$ between the front pin 5a and the bushing 3a. Rotary sliding friction is also produced on contact surface $S_2$ between the bushing 3a and roller 10a, and thus there are two rotary sliding surfaces $S_1$ and $S_2$.

On the other hand, when pin link $B_1$ next to the roller link $A_1$ turns along the pin circle of the driving sprockets 6, its trailing end or rear turns downward, as shown in FIG. 4, with a front pin 5b (the rear pin of the roller link $A_1$) acting as a fulcrum. Since the outer link plates 4 comprising the pin link B are fastened to a pin 5, turning of the link $B_1$ produced sliding friction only on contact surface $S_3$ between the pin 5b and bushing 3b, with no rotary sliding friction occurring between the bushing 3b and roller 10b, and thus there is only one sliding surface $S_3$.

It will be understood from the foregoing that the number of rotary sliding frictional surfaces differs between the case when the inner roller link A turns, and the case when the outer pin link B turns. When the roller link A turns, the number of rotary sliding surfaces increases by one, producing additional friction between the pin 5a in the front of the running direction and the bushing 3a, and between the bushing 3a and roller 10a. The amount of heat is increased by rotary sliding friction from two surfaces. When the pin link B turns, the only rotary sliding surface exists between the pin 5b and the bushing 3b, developing wear only at these positions, with generated heat being less than that for the roller link A. Therefore, as a result of long continued use of the chain, there are alternate locations along the chain where the amounts of friction and heat are large and where they are small at the connections in the front and in the rear of each link. Therefore the rotary sliding characteristic varies, wear results in elongation of the chain, and for chains on which lubricant is used, the heat causes deterioration of lubricant filling the clearances between the bushings and for heat aging of a seal ring of lubricant, further promoting wear.

The foregoing analysis of the conventional roller chain 1 also applies to bush chain which does not have rollers mounted on the bushings. The bushings directly engage the teeth of the sprockets. When the inner bush link turns, two surfaces between the pin and bushing and between the bushing and tooth face become rotary sliding surfaces, and when the outer pin link turns, only the surface between the pin and the bushing becomes a rotary sliding surface. In either of the roller or bush chains, heating of the chain connections greatly reduce the service life and durability of the chain.

It is desired that sliding friction at the front and in the rear of each link be equalized, and the locations where rotary sliding friction is high it should be lowered to a level practically the same as for locations where such friction is low.

Accordingly, it is an important object of this invention to provide a chain having improved service life and durability achieved by lowering the rotary sliding characteristic of the front of inner links to practically the same level as the front of outer links (the rear of inner links), whereby wear and heat are practically equalized in the front and in the rear of each link, and so that the load characteristic of every link with respect to rotary sliding friction is substantially equalized.

In accordance with this invention, the foregoing object is achieved by making the lengths of inner links longer than the tooth pitch of the sprockets, and by making the lengths of the outer links shorter than the tooth pitch of the sprockets. This produces an unequal length pitch chain: alternating chain connections are of two types, the first type having the roller or bushing of each link come into linear contact with the tooth root of the sprockets, and the second type having the roller and bushing come into contact with the tooth face of the sprockets.

The preferred form of the invention shown in FIGS. 5-8 employs a roller chain 20 comprising roller links C and pin links D. The roller links C are each formed by fixing a pair of inner roller link plates 21 to two bushings 22, and the pin link D is formed by securing a pair of outer pin link plates 23 to two pins 24. Each bushing 22 is mounted to rotate on its pin 24, and each roller 25 is mounted to turn on the periphery of its respective bushing 22. The roller chain 20 is installed over a driving sprocket 26 and a driven sprocket 27, and runs in the direction of the arrow as shown in FIG. 5. In this particular case the driving sprocket 26 is smaller in diameter than the driven sprocket 27, and therefore the roller chain 20 is used for a speed reduction drive.

The inner roller link C differs in pitch from the outer pin link D. The link $P_L$ of the roller link C is longer than the link $P_S$ of the pin link D, and the roller chain 20 is composed by connecting many of links C alternately with links D. Thus, the roller chain 20 is made to be an unequal length pitch chain, in which the average standard pitch Po of the chain 20, the length $P_L$ of the roller link C and the length $P_S$ of the pin link D are set as:

$$P_L = P_o + \Sigma, \quad P_S = P_o - \Sigma, \quad P_S < P_o < P_L$$

and, a substantially flat portion of the length U is formed on the roots 28a and 29a of sprocket teeth 28 and 29. The intervals between teeth 28 and 29 are made wider by as much as the length U of the flat portion, and $\Sigma \leq U$.

Because the average standard pitch Po of the chain 20 is the same as the tooth pitch of the sprockets 25 and 27, the sum of the two lengths $P_L$ and $P_S$ of the roller link C and the pin link D is the same as the length for two teeth 28 and 29 of the sprockets 26 and 27, and in reference to the tooth pitch of the sprockets 26 and 27 the roller link C is made longer than the tooth pitch and the pin link D is made shorter than the tooth pitch by the same amount.

Figure 6:
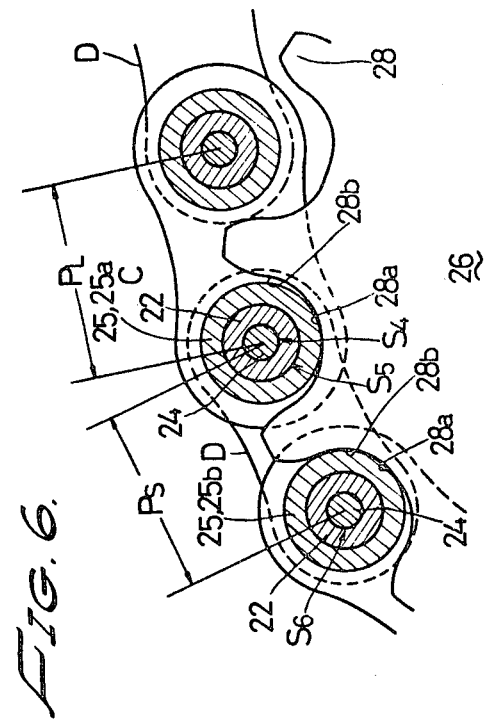
FIG. 6 is an enlargement of a portion of FIG. 5.

When the roller chain 20 is caused to move in the direction of the arrow shown in FIG. 5, under driving force of the sprocket 26, roller 25a in the front of the roller link C comes in contact only with the root 28a of the tooth 28 of the drive sprocket 26, as shown in FIG. 6, having a clearance with the tooth face 28b. The roller 25b in the front of the pin link D (or in the rear of the roller link C) comes in contact with the tooth face 28b. The roller 25a-to-sprocket 26 contact is a linear contact and the roller 25b-to-sprocket 26 contact is a face contact.

Each roller 25a is installed on a chain connection where two surfaces, the contact surface $S_4$ between the pin 24 and the bushing 22, and the contact surface $S_5$ between the bushing 22 and roller 25, become rotary sliding surfaces. Each roller 25b is installed on a chain connection where only the contact surface $S_6$ between the pin 24 and the bushing 22 becomes a rotary sliding surface. When engaging with the tooth 28, each roller 25 receives a force reaction due to the chain tension from the driving sprocket 26. The reaction force $S_2$ acts on the front roller 25a of the roller link C, and the tension load $S_1$ acts on the front roller 25b of the pin link D.

Figure 7:
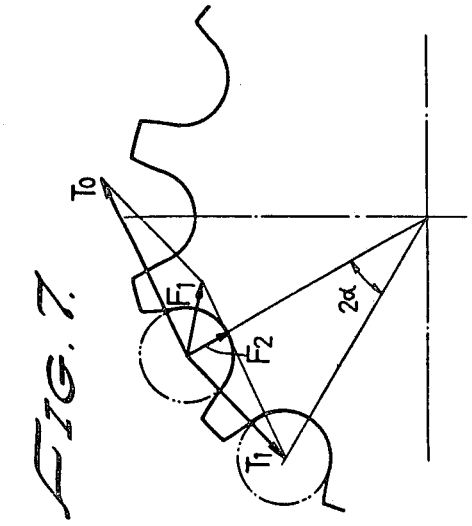
FIGS. 7 and 8 are vector diagrams showing relation of forces in chain-to-sprocket engagement.
Figure 8:
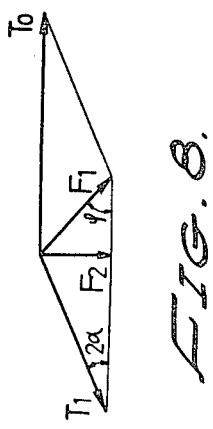

FIGS. 7 and 8 are vector diagrams showing the relation of forces concerning the chain tension load at the time of tooth face contact and tooth root contact. In the figures, To is the chain tension load, $T_1$ is the allotted load one tooth before the equilibrium of forces of engagement, $F_1$ is the reaction force at the tooth face contact, $F_2$ is the reaction at the tooth root contact, $\alpha$ is the engagement angle, and $\phi$ is the tooth face pressure angle.

Because the roller 25a comes into linear contact with only the tooth root 28a, and because the chain tension loading by the tooth 28 is small, although rotary sliding friction develops between the pin 24 and the bushing 22, and between the bushing 22 and the roller 25, this frictional force does not materially increase because it is physically proportional to the contact depression load. Therefore the amount of wear and heat of the pin 24, bushing 22 and roller 25 can be reduced as compared with conventional roller chains, as shown in FIGS. 1-4. On the other hand, because the roller 25b which receives a larger load than the roller 25a as it comes into face contact with the tooth, the rotary sliding friction develops only between the pin 24 and the bushing 22. Accordingly, wear and heat resulting from this friction are practically the same as for the roller 25a. In this way the amount of wear and heat in the chain connections are substantially equalized.

When the roller chain 20 moves into engagement with the driven sprocket 27, torque is transmitted to the sprocket 27 by the chain 20. The front roller 25a of the roller link C comes into face contact with the tooth face 29b of the tooth 29, and the front roller 25b of the pin link D comes into linear contact with the tooth root 29a, and thus the load characteristic reverses as compared to that on the driving sprocket 26. Therefore it may be assumed that because of the reversed contact area developing rotary sliding friction, equalization of wear and heat is not achieved. However, as described above, since the driven sprocket 27 is larger in diameter than the driving sprocket 26, the pitch angle $\alpha_2$ of the driven sprocket 27 is smaller than the pitch angle $\alpha_1$ of the driving sprocket 26, and when each link C, D turns along the pitch circle of the driven sprocket 27, the arcuate sliding movements produced by this turning between the pin 24 and the bushing 22, and between the bushing 22 and the roller 25, are shorter than those for the driving sprocket 26. The larger the driven sprocket 27 as compared to the driving sprocket 26, the shorter do such arcuate sliding movements become, and therefore the contribution to wear and heat at the driven sprocket 27 is reduced.

FIGS. 9 and 10 show a bush chain 30 embodying this invention. Each inner bush link E is formed by securing bush link plates 31 to front and rear bushings 32, and each pin link F is formed by securing pin link plates 33 to front and rear pins 34. Each bushing 32 is mounted to turn on its respective pin 34. Also, in this bush chain 30, as described in connection with the roller chain 20, the length $P_L$ of the bush link E and the length $P_S$ of the pin link F, and the average standard pitch Po of the chain 30 (tooth pitch of both drive and driven sprockets 26 and 27), are set according to the following equation:

$$P_L = P_O + \Sigma, \; P_S = P_O - \Sigma, \; P_S < P_O < P_L 2P_O = P_L + P_s$$

and, the above-mentioned pitch adjusting amount $\Sigma$ which increases or decreases the length of the bush link E or pin link F in reference to the average standard pitch Po is set as $\Sigma \leq U$ as compared to the length U of a substantially flat portion formed on the tooth roots 28a and 29a of the sprockets 26 and 27.

In the bush chain 30, no roller is present on the bushings 32. In conventional bush chains when each link turns, the bushing produced rotary sliding friction directly with the tooth face, producing heavy wear on both bushing and tooth face.

By contrast, in the bush chain 30 embodying the present invention, the bush link E and the pin link F are of unequal length pitch. The inner bush link E is made longer than the tooth pitch of the sprockets 26 and 27, and the outer pin link F is made shorter by the same amount. When the bush chain 30 is moving in the direction shown by the arrow in FIG. 9, the bushing 32a located in the front of the bush link E comes in linear contact with the tooth root 28a of the drive sprocket 26, and the bushing 32b located in the front of the pin link F comes in face contact with the tooth face 28b. Therefore it is possible to prevent excessive wear and excessive heat from developing on chain connections of the bushing 32a where the contact surface $F_7$ between the pin 34 and bushing 32 and the contact surface $F_8$ between the bushing 32 and the tooth face 28a become two rotary sliding surfaces. In this way wear and heat is substantially minimized with that developed by the chain connections of the bushing 32b where the contact surface $S_9$ between the pin 34 and bushing 32 becomes the only rotary sliding surface, and wear on the tooth face is minimized.

In each of the embodiments of the invention described above, making the chain of an unequal length pitch makes it possible to reduce the heat level of the whole chain, and thereby substantially to minimize heat deterioration of lubricant and heat aging of seal ring sealing lubricant. If the chain should become fouled with mud, etc., and if dirt penetrates between bushings and rollers in the case of a roller chain, the front of each roller link does not have rotary sliding movement on the tooth face and is thus affected less from grinding by mud. Service life and durability are improved. In the case of a bush chain, clearance insured between the bushing at the front of each bush link and the tooth face of the sprocket minimizes bad effects from mud or other foreign matter. Furthermore, the present invention is effective to reduce the contact area of the entire chain with the sprocket, and to minimize noise and vibration through prevention of local deterioration.

In order to form an unequal length pitch chain, it is sufficient to change the hole pitch dimensions of conventional link plates, and therefore manufacture is not difficult.

Practical tests conducted with chains embodying the present invention and installed over sprockets, and having a pitch variation of $\Sigma$ for inner links (roller links in the case of a roller chain and bush links in the case of a bush chain) and outer links (pin links in the case of both roller chain and bush chain) is set in the range of 0.2% to 4% of the average standard pitch Po for effective results.

As is clear from the foregoing description, in accordance with this invention, because the length of the inner links is made longer than the tooth pitch of the sprockets, and the length of the outer links is made shorter than the tooth pitch by the same amount, the problem of rotary sliding characteristics relating to chain turning at the connections before and after each link is solved. The result is substantial equalizing of the amounts of wear and heat, thereby accomplishing improved service life and durability of the chain.

Having fully described our invention, it is to be understood that we are not to be limited to the details herein set forth but that our invention is of the full scope of the appended claims.

We claim:

1. In combination: a sprocket having equally spaced teeth, a chain for cooperation with the sprocket, having a series of alternating pairs of inner links and outer links, each inner link being longer than the tooth pitch of the sprocket, each outer link being shorter than said tooth pitch by the same amount, and each pair of links being adapted to receive a sprocket tooth between them.

2. The combination of claim 1 in which the length of the inner link is in the range from 0.2% to 4% greater than the standard pitch of the teeth of the sprocket, and wherein the length of the outer link is shorter than said pitch by the same amount.

3. In combination: a sprocket having equally spaced teeth, a roller chain for cooperation with the teeth of the sprocket, the chain having a series of alternating pairs of inner links and outer links, each of the outer links comprising a pair of outer link plates fixed to spaced parallel pins, each of said inner links comprising a pair of bushings mounted to turn on pins of the outer links and having inner link plates fixed to said bushings, a roller mounted to turn on each bushing and adapted to contact teeth of the sprocket, each pair of links being adapted to receive a sprocket tooth between them, the length of each inner link plate being longer than the tooth pitch of the sprocket and the length of each outer link plate being shorter than said tooth pitch by the same amount.

4. The combination of claim 3 in which the length of the inner link plates is in the range from 0.2% to 4% greater than the standard pitch of the teeth of the sprocket, and wherein the length of the outer link plates is shorter than said pitch by the same amount.

5. In combination: a sprocket having equally spaced teeth, a bush chain for cooperation with the teeth of the sprocket, comprising a series of alternating inner links and outer links, each outer link comprising a pair of link plates fixed to spaced parallel pins, each pin having a bushing mounted to turn thereon, a pair of inner link plates fixed to bushings mounted on adjacent pins and comprising inner links, each inner link plate being longer that the tooth pitch of the sprocket and each outer link plate being shorter than said tooth pitch by the same amount, said bushings being adapted for contact with the teeth of the sprocket, a sprocket tooth being received between each adjacent pair of bushings.

6. The combination of claim 5 in which the length of the inner link plates is in the range from 0.2% to 4% greater than the standard pitch of the teeth of the sprocket, and wherein the length of the outer link plates is shorter than said pitch by the same amount.

7. In combination: a sprocket having equally spaced teeth and having a substantially flat portion at each root between teeth, a chain for cooperation with the sprocket, the chain having a series of alternating pairs of inner links and outer links, each inner link being longer than the tooth pitch of the sprocket, each outer link being shorter than said tooth pitch by the same amount, each pair of links being adapted to receive a sprocket tooth between them, the length of said flat portion being equal to or greater than said amount.

* * * * *